Nov. 10, 1931.　　　L. H. DAVIS　　　1,831,098

ANCHORING DEVICE

Filed Jan. 29, 1930

Inventor

LEWIS H. DAVIS

By Spencer, Hardman and Fehr

Attorneys

Patented Nov. 10, 1931

1,831,098

UNITED STATES PATENT OFFICE

LEWIS H. DAVIS, OF DAYTON, OHIO, ASSIGNOR TO DELCO PRODUCTS CORPORATION, OF DAYTON, OHIO, A CORPORATION OF DELAWARE

ANCHORING DEVICE

Application filed January 29, 1930. Serial No. 424,250.

This invention relates to an anchoring device, particularly adapted operatively to connect the operating member of a hydraulic shock absorber with a part of a vehicle.

It is among the objects of the present invention to provide means for securing a rigid connector link to the axle of a vehicle.

A further object of the present invention is to provide a rigid connector link with an attachment member adapted to be received by and secured to a bracket provided on the axle of a vehicle, said bracket being formerly used to secure the one end of a flexible instrumentality to the axle.

Further objects and advantages of the present invention will be apparent from the following description, reference being had to the accompanying drawings wherein a preferred embodiment of one form of the present invention is clearly shown.

Figure 1:
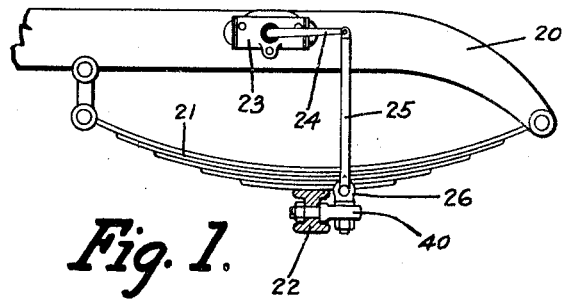
Fig. 1 is a fragmentary side view of a vehicle chassis, the invention being applied thereto. The vehicle wheels have been omitted for the sake of clearness.

Referring to the drawings, the numeral 20 designates the frame of the vehicle to which a vehicle spring 21 is hingedly secured. Spring 21 is supported upon the axle 22, said axle in turn being supported by the vehicle wheels (not shown in the present drawings). The shock absorber 23 is secured to the frame 20 and has an operating arm 24 to the free end of which is secured one end of the connector link 25. The other end of said connector link 25 is hingedly secured to an attachment member 26.

Figure 2:
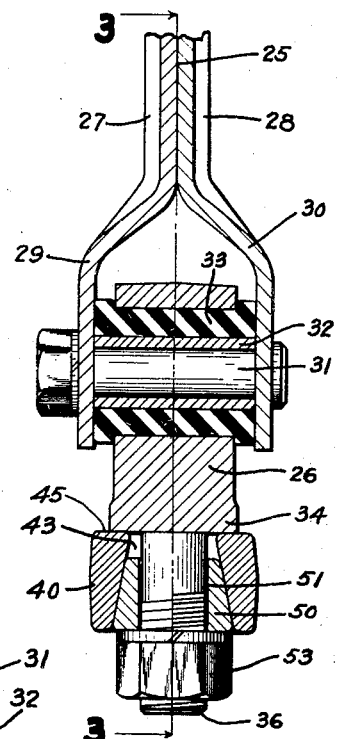
Fig. 2 is a transverse section taken through the anchoring device along the line 2—2 of Fig. 3.
Figure 3:
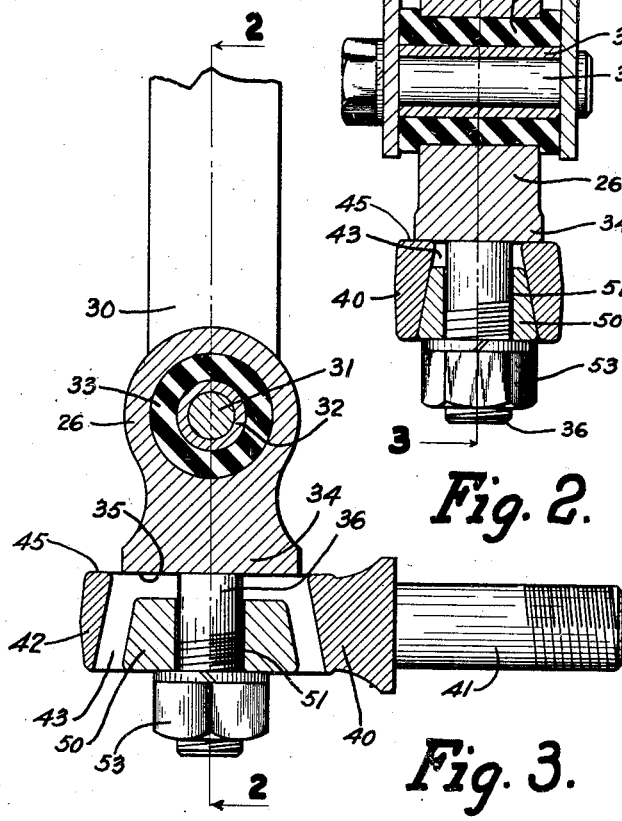
Fig. 3 is a sectional view taken along the line 3—3 of Fig. 2.

As shown in the drawings, the connector link is made up of two formed members 27 and 28 secured together in any suitable manner, preferably by spot welding, the ends of said members 27 and 28 having outwardly flared portions forming forked ends. The forked end which receives the attachment member 26 comprises the flared out portion 29 on the part 27 of the link and the flared out portion 30 on the part 28 of the link. As shown in Fig. 2 a stud 31 extends from the portion 29 to the portion 30 and has a metallic sleeve 32 surrounding it between said portions 29 and 30. A rubber sleeve 33 surrounds the metallic sleeve 32, said rubber sleeve fitting into and extending through an opening in the attachment member 26. From this it may be seen that the connector link 25 is yieldably secured to the attachment member 26 due to the interposition of the rubber sleeve 33 between the metallic bearing sleeve 32 supported by the link and the attachment member 26. The attachment member 26 has a foot 34 provided with a plane surface 35 from which a stud portion 36 extends, the end portion of the stud being provided with screw threads.

Figure 4:
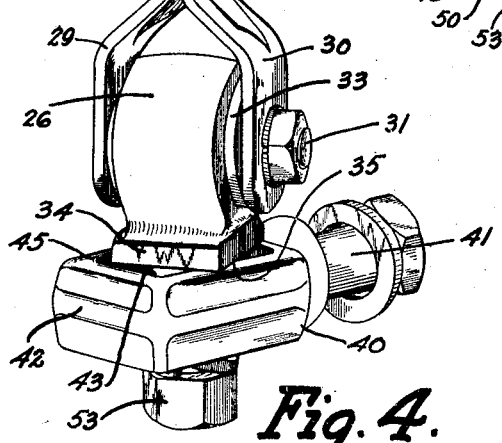
Fig. 4 is a fragmentary, perspective view of the connector link and its anchoring device.

On vehicle axles previously equipped with hydraulic shock absorbers of a certain, single acting type it has been the custom to provide a bracket adapted to secure one end of a flexible instrumentality to the axle. In the present instance, the bracket 40, which was used for securing such a flexible instrumentality to the axle, comprises a stud portion 41, having screw threads at its outer end, and a body portion 42, preferably integral with said stud portion. The body portion of this bracket is provided with an opening 43, the dimension of which, longitudinally of the bracket, is greater than the dimension transversely of the bracket as shown in Fig. 4. The inner surfaces or walls of this opening all slope, converging toward the flat side 45 of the bracket. Previously, the flexible instrumentality extending through the opening 43 of the bracket 40 was provided with a loop which contained a wedge of some sort, said wedge preventing withdrawal of the loop from the bracket, thus securing said instrumentality to the bracket. In the present instance, applicant provides a wedge-shaped block 50 which fits into the opening 43 transversely, that is, said block fits against the two longer surfaces of said opening. The longer dimension of said block, however, is substantially less than the longer dimension of the opening 43 whereby space is provided permitting adjustment of the block longitudinally of the opening in the bracket 40. Block 50 has an opening 51 through which the stud 36 of the attachment member extends. A nut 53 is screwed upon the stud 36 and engages block 50 so that said block is urged into the opening 43 engaging the longer sloping sides of said opening while the foot 34 of the attachment member is clamped tightly upon the upper flat surface 45 of the bracket. The construction of this anchoring device permits adjustment of the attachment member 34 longitudinally of the body portion 42 of the bracket and it also permits rotation of the attachment member 34 relative to the top surface 45 of said bracket so that the attachment member 34 may be adjusted properly to receive the connector link secured to the operating member 24 of the shock absorber.

Applicant has provided an anchoring device whereby the connector link of a double acting hydraulic shock absorber may readily be attached to a bracket formerly used for securing a flexible shock absorber operating instrumentality to the axle of the vehicle. This is of a pecuniary advantage to the purchaser of double acting shock absorbers, whose car has previously been equipped with single acting shock absorbers using such a flexible instrumentality for operating same, for, it substantially eliminates the cost of removing the old axle brackets and the substitution of newly purchased ones.

While the form of embodiment of the present invention as herein disclosed, constitutes a preferred form, it is to be understood that other forms might be adapted, all coming within the scope of the claim which follows.

What is claimed is as follows:

In a device for adjustably attaching the connecting link of a shock absorber to a vehicle axle, the combination with a bracket attached to said axle and having a rectangular opening longer longitudinally of the bracket than transversely thereof, the longer, interior surfaces of said opening converging as they approach the upper surface of said bracket; of an attachment member on the connecting link, provided with a foot portion adapted to seat upon the upper surface of the bracket and having a threaded shank extending through the opening in the bracket; an apertured, wedge shaped block fitting over said shank and into the opening of the bracket, two sides of the block engaging the converging surfaces of said opening, the other two sides thereof being spaced from the corresponding surfaces of said opening; and a nut threadedly engaging said shank and the lower surface of the block, for urging the block into the opening of the bracket whereby the foot of the attachment member is tightly clamped upon the bracket.

In testimony whereof I hereto affix my signature.

LEWIS H. DAVIS.